Sept. 5, 1967  R. E. HANSLIP ET AL  3,339,909
TORSION BAR SPRING SOCKETS

Filed April 19, 1965  2 Sheets-Sheet 1

INVENTORS
RICHARD E. HANSLIP
JAMES E. LYON
BY

ATTORNEY

INVENTORS
RICHARD E. HANSLIP
JAMES E. LYON

BY

ATTORNEY

United States Patent Office 3,339,909
Patented Sept. 5, 1967

3,339,909
TORSION BAR SPRING SOCKETS
Richard E. Hanslip, Toledo, and James E. Lyon, Perrysburg, Ohio, assignors to The Mather Company, Toledo, Ohio, a corporation of Ohio
Filed Apr. 19, 1965, Ser. No. 448,967
10 Claims. (Cl. 267—57)

ABSTRACT OF THE DISCLOSURE

This invention relates to a socket for the end of a torsion spring with an elongated cross-sectional area, which socket has a slot that is slightly larger in size than the cross-sectional area of the spring and of similar configuration, so that the end of the spring may easily project through the slot and may have a twisting action in the slot. The socket also includes a means, such as an aperture and pin or dog, adjacent the socket end of the spring for holding the end of the spring in the slot. The socket may be provided with shim means held between the slot and spring surfaces which shim means oppose the normal spring load to provide for adjustment thereof. When the socket is used for the end of a U-shaped torsion spring, a bracket permitting the spring to twist with relative freedom may be used for resiliently supporting one of the legs of the spring adjacent its bight.

SUMMARY OF INVENTION

Generally speaking, this invention comprises a torsion spring unit which may include U-shaped torsion springs, such as those composed of a pair of parallel torsion elements connected by a torque transfer element. The ends of the torsion elements have an elongated cross-section and may be anchored to relatively movable pivoted members by socket means. This socket means for at least one end of such a torsion spring includes a plate member having a slot therethrough for receiving said end of the torsion element, which end passes through the slot to provide an inactive spring end on the other side of the plate from the active spring element itself, and this inactive end may be apertured to receive a pin means to retain the torsion element in the slot. The slot may further include semi-circular notches at opposite corners thereof for receiving similarly shaped shim means having flat sides for engaging the opposite flat surfaces of the torsion elements, at least one of which shim means may also be anchored in position by the pin means which further retains the inactive end of the spring element in the socket. The torsion element may be adjusted by using different height or thickness shims and thus vary the pre-set torque in the spring element.

(A) *Objects and advantages*

An object of the invention is to provide a connecting structure or socket means for one or both ends of a torsion member by which the tendency to fatigue failure of the torsion member is greatly reduced, particularly at its connecting ends.

Another object of this invention is to produce a new, efficient, simple, effective and economic end attaching socket means for torsion members.

Another object of the invention is to provide socket means for the end of a torsion bar or spring having a uniform flat or rectangular cross-section.

Another object of the invention is to provide a bracket or plate member with a rectangular slot or socket for freely receiving the end of a torsion member, together with means cooperating with the inactive end of the torsion member to retain the same in the socket.

Still another object is to provide such torsion spring end attaching means which may be easily changed or adjusted to apply different pre-set torques to the spring.

A further object is to provide means for preventing vibration of and/or provide support for such torsion springs between their ends.

Still a further object is to provide a socket means of softer material than the torsion spring retained loosely therein whereby the action of the harder spring surfaces against the socket Brinell's or hardens the socket to provide a better seat for the spring.

BRIEF DESCRIPTION OF THE DRAWING

The above mentioned and other features and objects of this invention and the manner of attaining them will become more apparent and the invention itself will be understood best by reference to the following description of embodiments of the invention taken in conjunction with the accompanying drawings, wherein.

Figure 1:
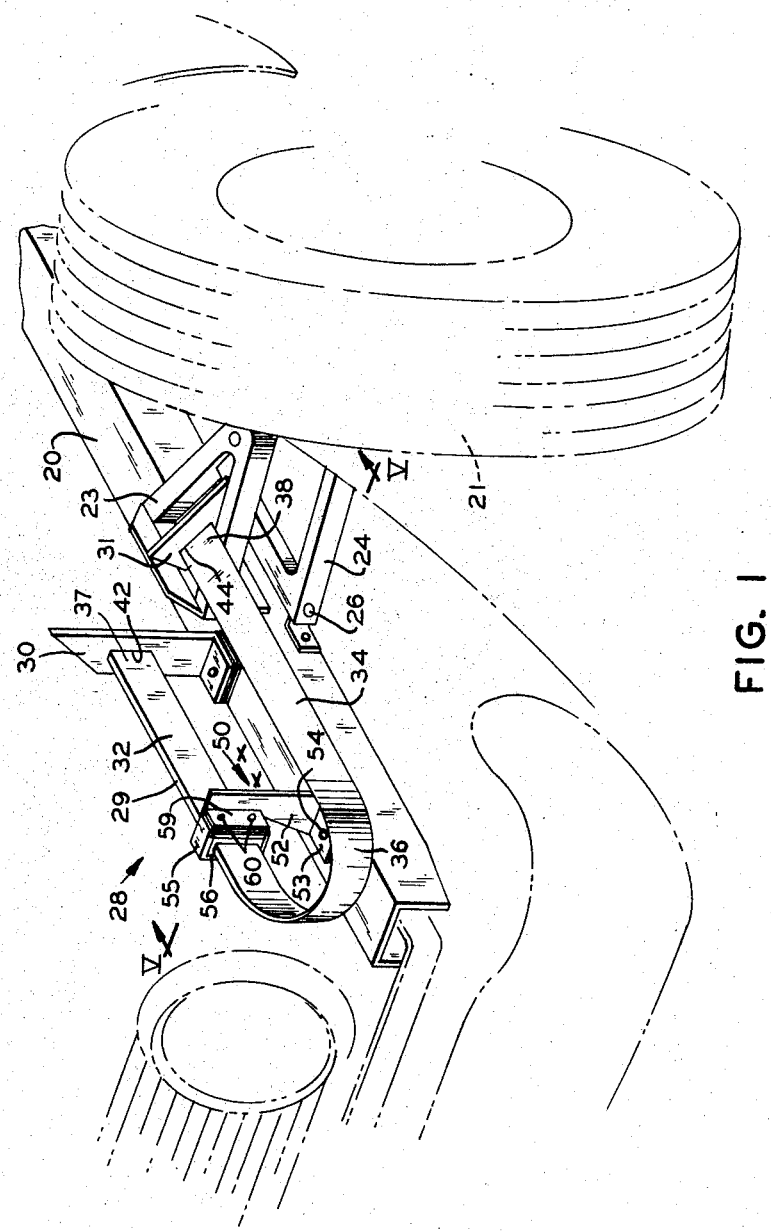
FIG. 1 is a fragmentary perspective view of a vehicle showing an installation incorporating one embodiment of a U-shaped torsion spring connection according to the present invention.

Description of preferred embodiments, which is:

Referring to the drawings and particularly to FIG. 1, a fragmentary portion of a vehicle is shown as including a longitudinal side sill or frame member 20 to which a front wheel 21 is connected by upper and lower lever arms 23 and 24 pivoted at 25 and 26, respectively, to the frame member 20 to permit vertical movement of wheel 21. A torsion spring unit indicated generally at 28 may include a spring member 29 and bracket members 30 and 31. Spring member 29 of generally rectangular cross-section, illustrated as being of substantially U-shape in plane view, may be disposed above and along frame member 20 and has spaced generally parallel legs 32 and 34 connected by a torque transfer portion 36. Portion 36 may be formed at any desired radius to fit the space available for installation of the unit 28, and need not be of the semi-circular curved shaped shown. The end portions 37 and 38 of the legs 32 and 34 may be mounted by the brackets 30 and 31 comprised primarily of plate members having generally rectangular slots or sockets 42 and 44 for receiving the end portions of the legs 32 and 34. Bracket 30 is fixed to frame member 20 and thus is a stationary support for leg 32, while bracket 31 is fixed to lever arm 23 for pivoted movement therewith and provides a movable support for leg 34 of spring 29.

Figure 2:
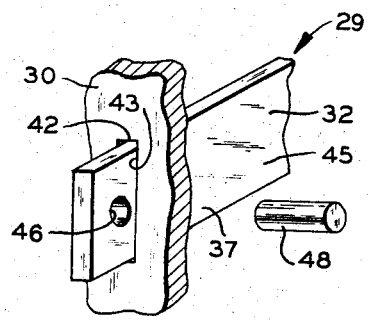
FIG. 2 is an enlarged partially exploded perspective view showing the form of socket connection means of FIG. 1, with a pin for retaining the inactive end of the torsion element.

The slots 42 and 44 are larger than the cross-section of the ends 37 and 38 of the legs 32 and 34 providing clearance so that such ends may be readily projected through the slots. As shown in FIG. 2, the slot 42 or 44 may be rectangular and the inside surfaces of the slots softer than the outside surfaces of the spring 32 so that the twisting action of the spring end during use hardens by movement and pressure, or Brinell's the edges of the slot and thus forms a seat for the spring.

The torsion spring element 29 may be fabricated from commercial leaf spring stock of standard rectangular cross-section and hardness having a width considerably greater than its thickness. Thus, when the ends of the element 29 are positioned in the sockets 42 and 44 (FIG. 2) the longer sides of the sockets provide comparatively long, narrow bearing faces 43 for the side faces 45 of the spring element 29 so that the spring is not restrained in twisting and therefore no undue strains or stresses are induced in the edges of the spring.

In the event both ends of the torsion spring are loosely fitted into slots 42 and 44, means are provided to prevent the spring 29 from working out of and to retain the spring ends 37 and 38 in their slots or sockets. To accomplish this an aperture may be provided in the spring adjacent each inactive end thereof as at 46 for the reception of a drive pin or other fastener 48. However, if one end of the spring is fastened, such as by bolts in FIGS. 4 or 11 in Hanslip U.S. Patent No. 3,022,992, then a pin is not necessary to retain the other end of the torsion spring.

Figure 3:
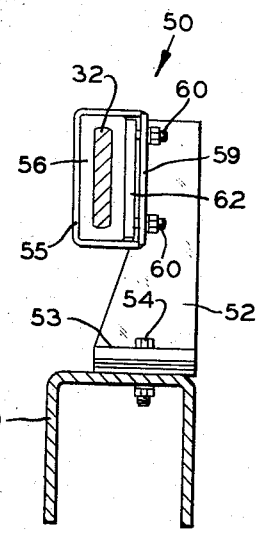
FIG. 3 is an end view of the supporting bracket for the U-shaped torsion spring shown in FIG. 1.

As shown in FIG. 1, additional means may be provided to support and retain the spring unit 28 in an operative position. Such means may take the form of one or more bracket assemblies 50. Bracket assembly 50 (FIGS. 1 and 3) may be comprised of an upstanding supporting arm member 52 having a flanged lower end 53 apertured to receive a bolt 54 or the like for anchoring the bracket to a frame member such as member 20 of the vehicle. To the upper end of arm 52 may be welded or otherwise secured, a girdle or clamp member 55 for supporting a generally rectangular rubber or like resilient bushing 56 surrounding the torsion bar leg 32 that is mounted in the socket 42 of the relatively fixed bracket 30. The girdle or clamp 55 of generally rectangular shape has a back wall 59 which may be provided with a pair of threaded apertures for receiving adjusting screws 60 whose inner ends bear on a pressure plate 62 in engagement with one side face of bushing 56 to vary the shock absorbing characteristics of the resilient bushing, as desired.

Figure 4:
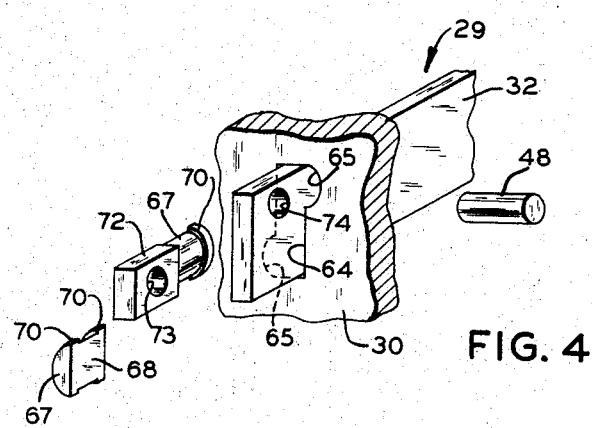
FIG. 4 is an enlarged view similar to FIG. 2 showing another embodiment of the connection means of this invention.
Figure 5:
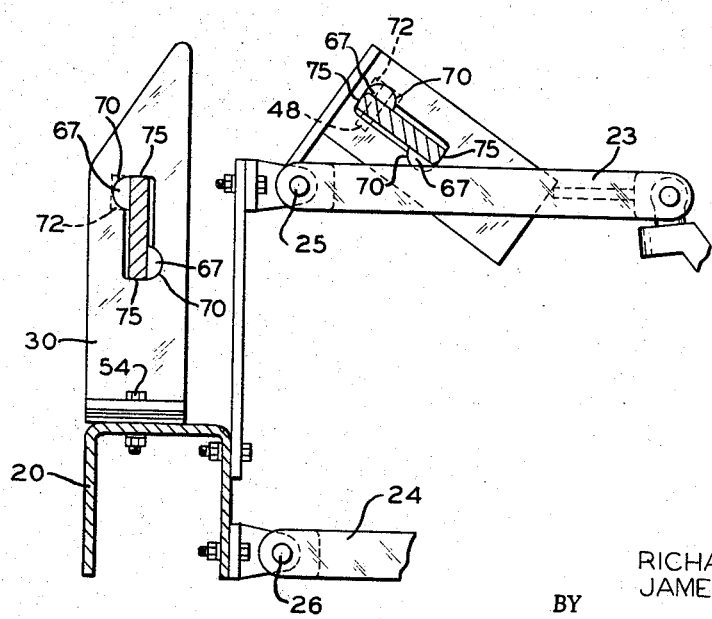
FIG. 5 is an enlarged detail view of a U-shaped torsion spring connection for a vehicle as shown in section along line V—V of FIG. 1, but showing the embodiment of the connection means shown in FIG. 4.

In FIGS. 4 and 5 is shown another embodiment or modified form of socket having rectangular central slot portion 64 and being additionally provided with diametrically opposite semi-circular notches 65 in which may be located semi-cylindrical bearing members or shims 67 having their flats 68 in engagement with the flat opposite surfaces of the springs 29 or elements 32 or 34, adjacent the ends and edges thereof. Such arrangement provides comparatively large seats adjacent opposite corners of the spring leg therein for the transmission of torque loads. The shims 67 may be flanged at 70 along their semi-circular end portions to engage opposite faces of the plate 30 or 31 and to retain the shims in position. One or both of the shims 67 may further be provided with a longitudinal extension 72, apertured at 73. When aligned with an aperture 74 in the inactive end and/or adjacent the end of spring leg, a pin such as 48 may be passed through both apertures to locate said shim for better retaining the spring leg 32 in the socket.

In addition to being rectangular in cross-section, the spring 29 may be provided with rounded edges 75 as in FIG. 5, where it will be noted also that the legs 32 and 34 have been pre-twisted or pre-set about their own axes so that the legs have the proper initial angular position to satisfy the mounting requirements and bear against the bearings or shims 67. The spring 29 may be adjusted in the FIGS. 4 or 5 forms of socket, by using different height shim or shims 67 to relax or wind up the spring as required.

While there is described above the principles of this invention in connection with specific apparatus, it is to be clearly understood that this description is made only by way of example and not as a limitation to the scope of this invention.

What is claimed is:

1. A socket for the end of a torsion spring having an elongated cross-sectional area at an end thereof, comprising:
   (A) a torsion spring having two ends,
   (B) means for attaching one end to one of two relatively movable members,
   (C) means for attaching the other end to the other of said two relatively movable members comprising a plate having an elongated slot therethrough of an area slightly greater than that of said elongated cross-section of said other end of said torsion spring whereby said other end may easily project through said slot from one side of the plate member to the other, said inside surface of said slot being of softer material than the adjacent outside surfaces of the end of said spring in said slot, whereby the twisting action of said end in said slot Brinell's said inside surface of said slot to form its own seat and prevent undue strains on the ends of said torsion spring, and
   (D) means adjacent said other end for holding said other end in said slot.

2. A socket according to claim 1 wherein said spring comprises a U-shaped torsion spring.

3. A socket according to claim 2 including a bracket means along the leg of said U-shaped torsion spring which has its end fastened to one of said relatively movable members.

4. Mounting means according to claim 3 wherein said bracket means embraces one leg of said U-shaped spring adjacent the bight thereof.

5. A socket according to claim 1 wherein said other end that extends through said slot has an aperture therein, and wherein said holding means is a pin in said aperture.

6. A socket according to claim 1 wherein said elongated cross-sectional area comprises a rectangle.

7. A socket for the end of a torsion spring having an elongated cross-sectional area at an end thereof, comprising:
   (A) a torsion spring having two ends,
   (B) means for attaching one end to one of two relatively movable members,
   (C) means for attaching the other end to the other of said two relatively movable members comprising:
      (1) a plate having an elongated slot therethrough of an area slightly greater than that of said elongated cross-section of said other end of said torsion spring whereby said other end may easily project through said slot from one side of said plate member to the other, whereby said end has a twisting action in said slot,
      (2) substantially diametrically opposite semi-circular notches in said slot, and
      (3) a pair of semi-circular bearing members fitting in said notches as shims between said notches and the diametrically opposite surfaces of said spring.

8. A socket according to claim 7 wherein said shims comprise outwardly extending flanges along their semi-circular area for engaging the opposite faces of said plate for retaining said shim in position.

9. A socket according to claim 7 wherein said other end that extends through said slot has an aperture therein, and includes means in said aperture for holding said other end of said spring in said slot.

10. A socket according to claim 9 wherein at least one of said shims is provided with an extension having an aperture therein, said aperture in said shim is in alignment with the aperture in said end of said spring, and said holding means extends through both said apertures for further retaining said spring.

References Cited

UNITED STATES PATENTS

| | | | |
|---|---|---|---|
| 2,606,020 | 8/1952 | Anderson | 267—57 |
| 3,150,869 | 9/1964 | Birney | 267—57 |

FOREIGN PATENTS 259,628  6/1949  Switzerland.

ARTHUR L. LA POINT, *Primary Examiner.*

EUGENE G. BOTZ, *Examiner.*

R. M. WOHLFARTH, *Assistant Examiner.*